UNITED STATES PATENT OFFICE.

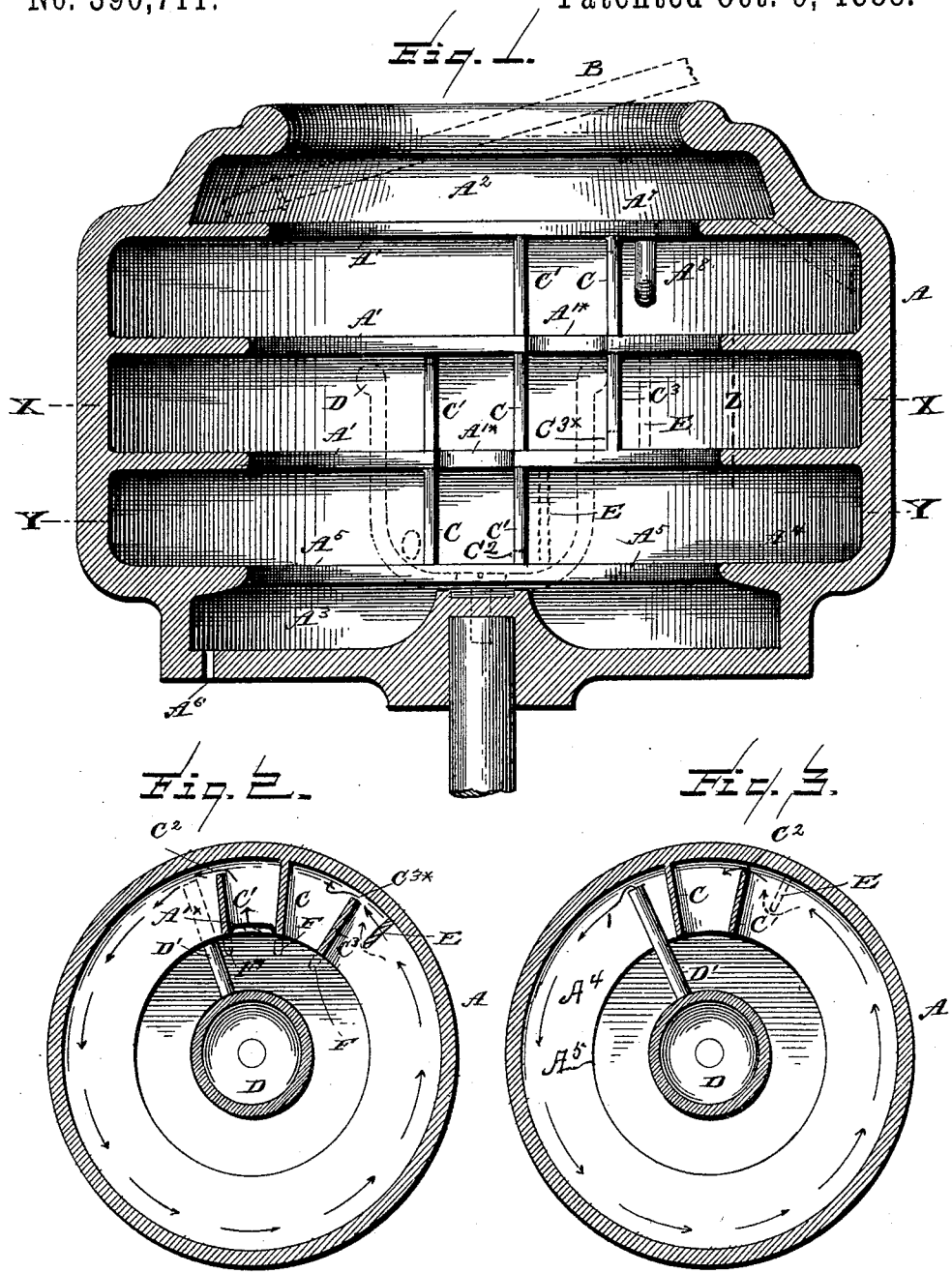

CHARLES D. SHEPARD, OF NEW YORK, N. Y.

CENTRIFUGAL LIQUID-SEPARATOR.

SPECIFICATION forming part of Letters Patent No. 390,711, dated October 9, 1888.

Application filed October 1, 1887. Serial No. 251,245. (No model.)

*To all whom it may concern:*

Be it known that I, CHARLES D. SHEPARD, a citizen of the United States, residing at New York, in the county of New York, State of New York, have invented certain new and useful Improvements in Centrifugal Liquid-Separators, of which the following is a specification, reference being had therein to the accompanying drawings.

This invention has relation to centrifugal machines; and the principal object in view is to construct the bowl thereof in such a manner as to form a series of compartments therein, and to provide certain devices in each compartment and certain means of communication from one of said compartments to the other, so as to make each compartment in effect a separating-bowl in and of itself. In other words, the object may be considered to be the construction of a multiple bowl, or one in which each compartment is adapted to perform the functions of receiving, separating, and delivering the separated elements of a liquid passing therethrough.

Other objects of the invention will appear in the following description, and the novel features of the invention will be particularly pointed out in the claims.

Referring to the drawings, Figure 1 is a central vertical section of a bowl for centrifugal machines constructed in accordance with my invention. Fig. 2 is a horizontal section on the line $x$ of Fig. 1, and Fig. 3 is a similar section on the line $y$ of Fig. 1.

Like letters of reference indicate like parts in all the figures of the drawings.

I provide the bowl A with any desired number of shelves A'. An upper annular chamber may also be provided, as shown at $A^2$. A depending neck, $A^3$, may be provided at the bottom of the bowl, as shown; or the same may be dispensed with, in which case the bottom $A^4$ of the bowl proper may not be provided with the opening $A^5$, leading into the neck $A^3$, but would be provided with any desired well-known form of discharge-outlet for a lighter or heavier constituent, whichever it is desired to deliver at the bottom of the bowl. In this instance, however, I have illustrated an outlet, $A^6$, for the lighter constituent, the heavier being discharged from an upper compartment into the upper annular chamber, $A^2$, from which it may be delivered by means of any desired form of conductor B.

As my invention has relation, practically speaking, to an arrangement of shelves, vertical blades, or partitions, and communicating ports or passages, it will be seen that, as above indicated, said invention is entirely independent of any particular means for feeding the liquid into the bowl or for discharging the separated constituents thereof from the bowl. The means for these purposes illustrated herein are shown merely for the purpose of presenting one form which may be employed.

From the bottom $A^4$ of the bowl proper to the next shelf above the bottom there extends a solid imperforate blade, C, and parallel therewith is a companion blade, C', provided with a port, $C^2$, arranged at the inner periphery of the bowl. This port $C^2$ is preferably narrow, and may extend partly from one shelf to the other or wholly from one shelf to the other.

The blades C C', together with the shelf A' and the shelf or bottom of the bowl $A^4$, constitute what I denominate a "locking-chamber." Between the next two shelves A' similar blades, C C', are provided, the ported blade C', however, being arranged on the opposite side of the locking-chamber to that at which the ported blade of the chamber below is located. In other words, the ported blade of one chamber is arranged above the imperforate blade of the next chamber below.

As thus far described, it will be seen that if the liquid to be separated—taking, for example, milk—is delivered into the lower compartment (that formed by the bottom $A^4$ and the shelf A' of the bowl) at one side of the imperforate blade C, as shown by the arrow 1 in Fig. 3, said milk will take the course indicated by the arrows, extending along and close to the inner periphery of the bowl, the point where the centrifugal force is greatest, and will come into contact with the blade C'. The port $C^2$ being narrow, but a very slight quantity of the milk can pass therethrough into the locking chamber, and with the exception of the exceedingly small quantity of cream which may pass with the first milk entering into the locking-chamber all of the cream in said milk entering the compartment has been separated and thrown to the front or inwardly beyond the port $C^2$ and naturally assumes the well-known form of an annular body. As the compartment fills with the freshly-incoming milk, the operation is repeated; but by reason of the increased quantity the cream-line is farther advanced inwardly and the heavier constituent wholly covers the port, so that no cream, or, at most, a very small portion, passes into the locking-chamber. As the compartment fills, the locking-chamber also fills with a liquid which is mainly the heavy constituent, and while said locking-chamber is filling, the milk in the compartment has, in a machine revolving at about eight thousand revolutions a minute, been subjected to at least the centrifugal force generated during two thousand revolutions. This, it has been proven by actual demonstration, is sufficient to almost wholly separate the lighter constituent from the heavier in this compartment. As soon as the locking-chamber becomes filled, the liquid therein passes upwardly through an opening or recess, $A'^x$, formed in the edge of the shelf at the top of the chamber, whereby a passage for said liquid is formed back of that point within the bowl where the annular body of the lighter constituent naturally forms in the compartment. It will be noticed that in this locking-compartment there is no wall or other construction at the opening $A'^x$, which prevents cream or a lighter constituent from passing inwardly to form or join an annular body of the same, so that the locking-chamber does not obstruct but aids separation of the constituents in a greater measure than if a pipe or other form of opening were employed. At this time—that is, when the locking-chamber becomes filled—the separated lighter constituent is delivered from the compartment. This may be accomplished by an outlet in the bottom of the bowl, as hereinbefore described, or by any other well-known means for the purpose. In this instance I have embodied the extended neck $A^3$ as a part of the bowl, whereby the cream is delivered by the action of centrifugal force around and below the edge of the opening $A^5$, and finally discharged by gravity through the opening $A^6$.

From the above description it will be seen that by reason of the obstruction to the flow of the milk by the locking-chamber the compartment in which the locking-chamber is located constitutes in and of itself a separating-bowl.

The same operation takes place in the next compartment above, wherein, by reason of placing the ported blade $C'$ on the opposite side of the locking-chamber and arranging the port at the inner periphery of the compartment, the liquid is fed into said compartment at the point where the centrifugal force is greatest and in the same relative position as it entered the first compartment. Now, by reason of the reversing of the blades $C$ $C'$, it is necessary to provide another blade, $C^3$, having a port, $C^{3x}$, on the same side of the imperforate blade as in the first compartment of the bowl, so that there are in the middle compartment thereof two locking chambers, whereby a continuation of the direction of circulation is secured. A passage, $A'^x$, is provided for the second locking-chamber to deliver the liquid into the locking-chamber of the upper compartment, from which the heavier constituent is delivered through a port, $A^7$, with or without a pipe, $A^8$, communicating therewith and extending into the compartment.

As thus far described, it will be seen that the heavier constituent may be delivered from the upper compartment. I have shown, however, in this instance an upper chamber without blades, to allow any suitable conductor to be employed for delivering the heavier constituent from the machine.

D represents a well-known form of feeding-bowl having a pipe, $D'$, for delivering the liquid at or near the inner periphery.

As shown by dotted line E in Fig. 1 and by section in Fig. 2, I may use a narrow blade arranged at the inner periphery of one or more of the compartments and opposite the ports $C^2$, in order to increase the obstruction of the locking-chamber, and thus in a measure more fully prevent the escape of the lighter constituent into the locking-chamber. This narrow blade may be adjacent to the entrance-port of one or more than one locking-chamber when more than one are employed, or adjacent to less than all of the entrance-ports of the locking-chambers. After all of the compartments are filled the lighter constituent in each separately joins that of the others, and finally joins the continuous annular body, which is discharged in the manner hereinbefore described, while the circulation and the independent separating operations are being performed in each compartment, as in separate and independent bowls.

As shown by dotted lines F, the blades $C$ $C'$ $C^3$ may be extended inwardly beyond the edges of the shelves, or one or more of them may be extended, in which case the upper wall of the locking-chambers may also be extended in a like manner.

I have illustrated the edges of the shelves and partitions as being on a vertical line with each other, and with a modification of the latter as extending inwardly beyond the shelves; but, if desired, and in order to give room for a thicker annular body of cream, I may reduce the width of a portion of the shelves and blades to about the dotted line Z, preferably of the shelves between the uppermost and lowermost of those employed.

Having described my invention and its operation, what I claim is—

1. A bowl for centrifugal machines provided with shelves and with blades extending from one shelf to another, one of the blades having a port and one of the shelves having at its inner edge a passage, thereby forming a locking-chamber, substantially as specified.

2. A bowl for a centrifugal machine provided with shelves and with blades between each pair of shelves, constituting locking-chambers, having in opposite walls of adjacent chambers ports, one of said shelves being provided with a passage affording communication between the locking-chambers, substantially as specified.

3. A bowl for a separating-machine having shelves forming three compartments, vertical blades arranged in pairs between the shelves to form chambers in the compartments, two chambers being located in the middle compartment, and ports and passages, substantially as specified.

4. A bowl for centrifugal machines provided with shelves and with blades arranged between the shelves to form locking-chambers, and ports arranged in the blades forming the opposite walls of adjacent locking-chambers, substantially as specified.

5. A bowl for centrifugal machines provided with shelves and with blades arranged between the shelves, one of which shelves is provided with a passage located at its inner edge between the blades, and means, substantially as described, for feeding and delivering liquid to and from the bowls, substantially as specified.

6. A bowl for centrifugal machines provided with two annular shelves, vertical blades arranged between the shelves, forming a locking-chamber, one of said blades being provided with a port and one of said shelves being provided with a passage, in combination with means for feeding and delivering liquid into and between the shelves and from above the upper shelf, substantially as specified.

7. A bowl for a centrifugal machine provided with shelves and with vertical blades arranged between the shelves to constitute locking-chambers, and with a blade arranged opposite the entrance-port of the locking-chamber, substantially as specified.

8. A bowl for a centrifugal machine provided with a series of shelves and between each pair of shelves with a pair of blades constituting a locking-chamber, and with a passage from the locking-chamber of one pair of shelves communicating with the next adjacent pair of shelves, whereby circulation from one shelf to another takes place through the locking-chamber, substantially as specified.

9. A bowl for centrifugal machines having shelves forming three compartments, and having pairs of blades constituting a locking-chamber in each compartment, which is located in the lower and upper portion of the bowl, and adjacent similar locking-chambers in an intermediate compartment, and ports and passages, substantially as specified.

In testimony whereof I affix my signature in presence of two witnesses.

CHARLES D. SHEPARD.

Witnesses:
  E. B. STOCKING,
  W. S. DUVALL.